Figure 1:
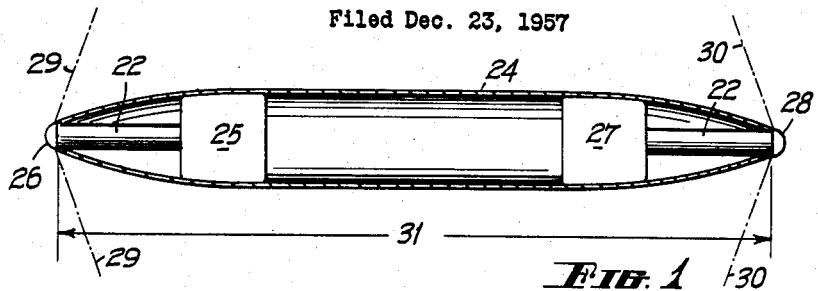

Dec. 18, 1962 R. P. BONNELL ETAL 3,068,752
WIDE ANGLE LENS SYSTEMS
Filed Dec. 23, 1957

3,068,752
WIDE ANGLE LENS SYSTEMS
Robert P. Bonnell, Brighton, South Australia, and Jack V. Ramsay, Sackville via Windsor, New South Wales, Australia, and Francis Alfred Thomas Dixon, Worcester Park, England, assignors to The Commonwealth of Australia, % The Secretary of the Department of Supply, Melbourne, Victoria, Australia
Filed Dec. 23, 1957, Ser. No. 704,679
Claims priority, application Australia Dec. 24, 1956
8 Claims. (Cl. 88—57)

This invention relates to wide angle lens systems.

It is already known to provide wide angle lenses whereby photographic images of part of a spherical field of view are produced, these having been previously used for example for sky photography where it was desired to locate or record objects from a large field on a single picture.

The objects of the present invention are firstly to provide a lens system in which a field of view in excess of 180 degrees solid angle is possible and secondly to provide such a lens system for use in ranging, calculating distance and aspect.

Methods of calculating distance and aspect are already known according to which a number of relatively wide angle lenses are used to produce a series of separate pictures which can then be co-related for ranging purposes but with the methods known heretofore considerable calculation was necessary, the need of which it is the object of this invention to reduce. Other objects are a reduction in the number of lenses and associated equipment, resulting in saving in weight, size, cost and for airborne applications reduced drag.

The advantages of providing a lens with a field of view in excess of 180 degrees will be obvious when it is considered that two such lens systems oppositely directed can give complete spherical coverage with if desired considerable marginal overlapping and, if a pair of such lenses are displaced by a known distance the system will provide information from which the distance and aspect of any object in the overlapping zone can be derived.

Further, two such pairs of lens systems, separated by a known distance on a base line and so arranged that the four lenses are not co-linear, will provide means of measuring the distance and aspect of any object because when the object is on the base line or its extension, the subsidiary base line first referred to can be used for calculating the distance and aspect.

Further, a single pair of lenses can provide information from which the aspect and distance of any three-dimensional object can be determined with respect to the lenses, if its dimensions are known and if it subtends a sufficient angle at the lenses.

The lenses can of course be associated with cameras for permanent recording purposes or they can be used for direct visual observation or can be used in conjunction with electronic viewing screens or the like according to the purposes to which they are to be put.

A single lens can, for instance, be provided having an angle of view of 210 degrees and if this is arranged with its axis vertical an observer can have a complete picture of everything within view and can at once decide its position, the advantages of this being that the whole field of view is at all times available to the observer and when an object moves into this field from any direction it will be seen.

It would of course be possible to use a scanning system to translate or magnify this image, or to use magnifying scanning lenses or similar means.

If now two such systems are arranged on a subsidiary base line, one pointing up and the other down, or for that matter at any opposite or approximately opposite angles, a complete spherical coverage results, with overlapping due to the lens system exceeding a 180 degree solid angle, and if two further similarly positioned lens systems are arranged on a main base line displaced from the first subsidiary base line by a known length of main base line, complete coverage, with ranging, results so that the intelligence conveyed by the two pairs of lenses and their associated cameras allow direct trigonometrical ranging and aspect determination of any object in any direction.

The application of such systems will be seen to be very wide because with the single lens or a pair of oppositely directed lenses a complete field of view can be given from armoured fighting vehicles or for use by infantry in house to house fighting where exposure for normal surveillance would be hazardous.

Where two such lens systems are mounted on an aircraft or aircraft wing, complete spherical coverage is given and these two systems allow ranging because they may be displaced on the subsidiary base line. By placing a similar further pair of lenses on the other side of, or elsewhere, on the aircraft direct ranging and aspect determination facilities are provided over the spherical coverage. The lenses can, of course, be associated with cameras.

Instead of using the lens with normal lighting they may be used in conjunction with infra red illumination and image converter devices for wide field of view surveillance at night, for instance to cover the area around a military post likely to be subject to enemy infiltration, particularly in jungle conditions.

The instrumentation system formed by the system of lenses and cameras, when applied to a missile and arranged to take a single picture from each camera at the instant the proximity fuse operates, will provide information from which the relative attitude and distance of the target can be determined. Because of the necessity of obtaining a very compact high speed shutter and the importance of reducing delays in operation to a minimum, the power of the initiating signal from the fuse may be used to fire and explosive to operate the shutter.

A similar system using cine-photographic techniques instead of single exposures is also possible and could be used to provide attitude information on a missile in flight or other data.

The lenses used for this wide angle application can be somewhat varied in their construction, but according to one lens system a negative lens is associated with a positive lens for wide angle short back focal length operation but this same lens may be associated with a further lens system if a long back focal length is required.

The ultra wide angle lens operates on the principle that a ray of light striking the lens at an angle less than a tangent to any particular part of the convex outer surface of the lens is refracted through this negative lens and directed to a point in the focal plane or to a further lens system so that if a negative lens is provided the tangents of the outer face of which at the edges subtends a solid angle of more than the angle of view required, that is of more than say 210 degrees, the lens will produce an image over the ultra wide angle required.

Figure 2:
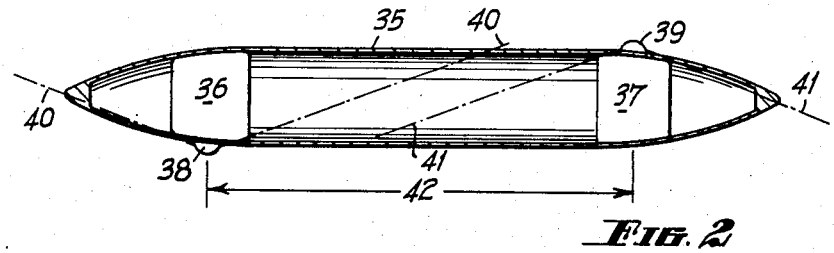
Figure 3:
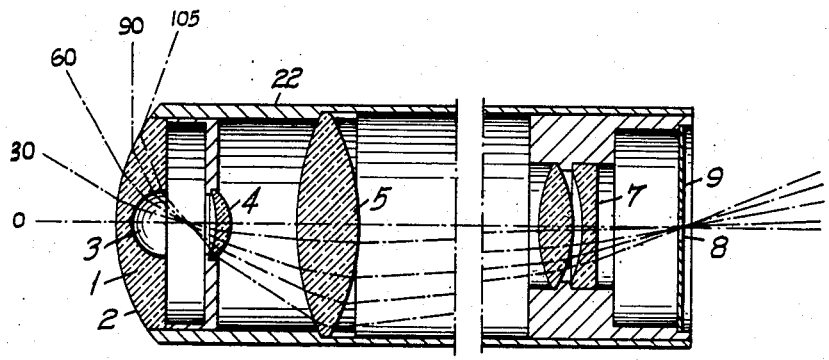
Figure 4:
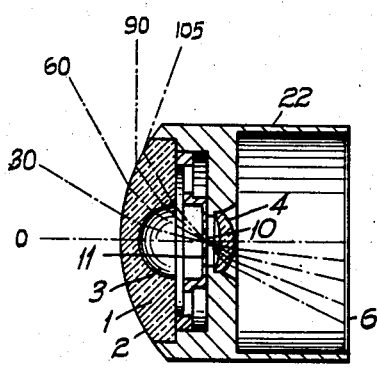

In order however that the invention may be more fully understood, embodiments will now be described with reference to the accompanying drawings in which:

FIG. 1 is a longitudinal section of a wing pod of an aircraft embodying a pair of longitudinally directed long back focus lenses with vertical overlap, associated with a pair of cameras, FIG. 2 is a similar view but showing short back focus lenses arranged for normal up and down direction with horizontal overlap, FIG. 3 is a longitudinal section of a long back focus lens, and FIG. 4 is a similar view of a short back focus lens.

Referring first to the front component of the lenses shown in FIGS. 3 and 4.

A negative lens 1 has a convex front face of a curvature sufficient to allow light rays of the required angle to enter the lens, as shown for instance by the ray at 105 degrees, the rear face of the lens 1 having a concave hollow 3 of spherical shape arranged in the path of the rays collected by the front face 2, a negative lens being thus formed which is capable of receiving light rays from a solid angle exceeding 180 degrees.

Although an angle of 105 degrees is shown on each side, this will vary according to the requirements of the lens and the extent of overlap required in a multiple lens embodiment as indicated in FIGS. 1 and 2.

A positive lens 4 directs the rays on to a collector lens 5 in the case of FIG. 3 on a focal plane 6 in the case of FIG. 4.

The collector lens 5 directs the rays on to a lens system 7 which then focuses them on to a film or the like placed at the required distance behind the aperture 8 in the diaphragm 9.

In the embodiment of FIG. 4 the aperture 10 is formed in a diaphragm 11 immediately behind the negative lens 1.

For the short back focal length lens of FIG. 4 it is thus only necessary to use a negative lens 1 having a face 2 of an external convex curvature about a radius point on the axis of the lens, while the inner concave hollow 3 of the lens is radial about a shorter radius also taken from the axis of the lens, such a lens having behind it an aperture 10 of the required size and on the other side of it a lens 4 of the focal length required for the system.

Instead of directing the image on to a film or the like at this short focus, the focal plane may be at the collector lens 5 of FIG. 3 which directs the rays to a normal lens system 7, in which case the aperture 8 may be associated with the normal back lens.

Both the above lenses give a continuously progressive picture of the complete area covered and operate successfully up to a solid angle of 210 degrees although this could probably be exceeded.

In each of the above embodiments the lens tube is designated 22, and this may take any particular form according to the mounting or other requirement.

A camera embodying any one of these lenses can be used as a simple nose camera and can then measure pitch, yaw, miss distance, and other similar factors.

The main purpose of providing a short and a long lens is to enable a selection of the position at which the camera is mounted. With a nose camera or where the camera lens points forwardly or rearwardly in a high speed vehicle or the like, it is obviously desirable to streamline the lens to the camera body and a long lens allows better accommodation in such a streamline nose shape.

A short lens on the other hand can better be built into a wing or the like to face up or down as it then presents only a small blister on the surface.

In FIG. 1 is shown how a pair of lenses can be mounted in a camera pod 24 on the end of a wing or other locality one camera 25 having its lens system 26 forwardly directed while the other camera 27 has its lens system 28 directed rearwardly, the lens systems in this case comprising the assembly shown in FIG. 3.

The solid angle coverage of these lenses is outward of the chain lines 29 and 30, and therefore, in the case of lenses as indicated in FIG. 3, covering a solid angle of 210 degrees. This angle results in an overlap of the fields of the two lenses at a plane at right angle to the axis of the pod 24, the extent of overlap being 30 degrees in this case.

Any object photographed by the two cameras 25 and 27 provided it falls into the field of overlap, can then be ranged in distance if the length of the base line 31 is known, and its aspect determined.

The arrangement of FIG. 1 thus allows two cameras 25 and 27 to give complete spherical coverage, with a zone of overlap about a plane at right angles to an axis drawn through the lens systems 26 and 28, in which ranging is given.

In the embodiment shown in FIG. 2 a pod 35 has a pair of cameras 36 and 37 mounted in it with lens systems 38 and 39 respectively pointing transversely to the pod in opposite directions, the one lens system 38 pointing downwards, the lens system 39 pointing upwards.

The solid angle of the lens system 38 is thus outwards of the chain lines 40, while the solid angle of the lens system 39 is outwards of the chain lines 41.

In this case the 30 degrees angle of overlap exists about a horizontal plane passing through the longitudinal axis of the pod 40, and ranging and aspect determination is thus possible in this portion of the lens coverage. The base line is indicated by 42.

The shorter lens system of FIG. 4 can be used in this embodiment, but it will be obvious that the effects can be obtained by any of the lenses described provided the focal plane of the camera can be suitably arranged.

It will be obvious that there may be a duplication of the camera systems, and four cameras can be mounted in pairs in two pods arranged one on each end of an aircraft wing system or elsewhere the added base line then allowing ranging and aspect data to be obtained over a spherical field of view.

From the foregoing it will be clear that by using our extended angle lens system on a pair of oppositely directed cameras, an overlap results about a plane medial to the cameras and at right angles to the axis of the lenses which, as well as giving completely spherical coverage, also allows ranging and aspect determination over a substantial angle.

Suitably arranged duplication of the system provides spherical ranging and aspect determination facilities.

We claim:

1. For determining distance and aspect of objects, a pair of lens systems spaced apart on a base line and substantially oppositely directed, each of said lens systems having a field coverage in excess of a solid angle of 180 degrees so that said fields overlap about a plane medial to the longitudinal axis of the said lens systems, the lenses of each said lens system comprising a negative lens component having its front face of an exposed convex curvature to collect light rays over a solid angle exceeding 180 degrees and having a coaxial internal concave face, a further coaxially arranged positive lens behind said negative lens, a mount arranged to support said lenses, and a common support for said mounts.

2. For determining distance and aspect of objects, a pair of lens systems spaced apart on a base line and substantially oppositely directed, each of said lens systems having a field coverage in excess of a solid angle of 180 degrees so that said fields overlap about a plane medial to the longitudinal axis of the said lens systems, the lenses of each said lens system comprising a negative lens component having its front face of an exposed convex spherical curvature to collect light rays over a solid angle exceeding 180 degrees, and having an internal concave spherical face of a shorter radius, said convex and said concave faces having their radius located on the longitudinal axis of the said lens, a positive lens behind said negative lens component to focus the image on to a focal plane, a mount for each of said lens systems supporting the lenses of each system coaxially, and a common support for said mounts to maintain said lens systems on said base line.

3. For determining distance and aspect of objects, a pair of lens systems spaced apart on a base line and substantially oppositely directed, each of said lens systems having a field coverage in excess of a solid angle of 180 degrees so that said fields overlap about a plane medial to the longitudinal axis of the said lens systems, the lenses of each said lens system comprising a negative lens component having its front face of an exposed convex spherical curvature to collect light rays over a solid angle exceeding 180 degrees, and having an internal concave spherical face of a shorter radius, said convex and said concave faces having their radius located on the longitudinal axis of the said lens, a positive lens behind said negative lens component, a collector lens behind said positive lens, a further lens system behind said collector lens to focus the image from the collector lens on to a focal plane, a mount for each said lens system supporting the lenses coaxially, and a common support for said mounts to maintain them on said base line.

4. For determining distance and aspect of objects, a pair of lens systems spaced apart on a support and substantially oppositely directed, each of said lens systems having a field of coverage in excess of a solid angle of 180° so that said fields overlap about a plane medial to the longitudinal axes of said lens systems, each lens system comprising a single negative lens component and behind same a coaxially arranged positive lens component both carried in a mount wherein said negative lens component has its front face of an exposed convex curvature to collect light rays over a solid angle exceeding 180 degrees and an internal concave face arranged to direct such rays through said positive component to a focal plane.

5. For determining distance and aspect of objects, a pair of lens systems spaced apart on a support substantially oppositely directed, each of said lens systems having a field of coverage in excess of a solid angle of 180° so that said fields overlap about a plane medial to the longitudinal axes of said lens systems, each lens system comprising a negative lens component and behind same to be coaxial therewith a positive lens component both carried in a mount wherein said negative lens component has its front face of an exposed convex curvature to collect light rays over a solid angle exceeding 180 degrees and having an internal concave face arranged to direct such rays through the said positive component, a collector lens coaxial behind the said positive lens, also in said mount, and a further lens system also coaxial in said mount to focus the rays from the collector lens on a focal plane.

6. For determining distance and aspect of objects, a pair of lens systems spaced apart on a support substantially oppositely directed, each of said lens systems having a field of coverage in excess of a solid angle of 180° so that said fields overlap about a plane medial to the longitudinal axes of said lens systems, each lens system comprising a negative lens component having its front face of an exposed convex spherical curvature to collect light rays over a solid angle exceeding 180 degrees, and having an internal concave spherical face of a shorter radius, said convex and said concave faces being radiused such that the centre of curvature of each said surface is located in the longitudinal axis of the said lens, a positive lens component behind said negative lens component, and a further lens means to direct said rays to a focal plane.

7. For determining distance and aspect of objects, a pair of lens systems spaced apart on a support substantially oppositely directed, each of said lens systems having a field of coverage in excess of a solid angle of 180° so that said fields overlap about a plane medial to the longitudinal axes of said lens systems, each lens system comprising a negative lens component and a positive lens component coaxially carried in a mount, said negative lens component having its front face of an exposed convex spherical curvature to collect light rays over a solid angle exceeding 180 degrees, and having an internal concave spherical face of a shorter radius, said convex and said concave faces being radiused such that the centre of curvature of each said surface is located in the longitudinal axis of the said lens to direct said rays through the said positive component to a focal plane.

8. For determining distance and aspect of objects, a pair of lens systems spaced apart on a support substantially oppositely directed, each of said lens systems having a field of coverage in excess of a solid angle of 180° so that said fields overlap about a plane medial to the longitudinal axes of said lens systems, each lens system comprising a negative lens component, a positive lens component, a collector lens and a further lens system, a mount supporting said lenses coaxially therein, said negative lens having its front face of an exposed convex spherical curvature to collect light rays over a solid angle exceeding 180 degrees, and having an internal concave spherical face of a shorter radius, said convex and said concave faces being radiused such that the centre of curvature of each said surface is located in the longitudinal axis of the said lens to direct said rays through said positive component and said collector lens and said further lens system to focus the image from the collector lens on a focal plane.

References Cited in the file of this patent

UNITED STATES PATENTS

| 42,880 | Schnitzer | May 24, 1864 |
| 2,373,815 | Del Riccio | Apr. 17, 1945 |
| 2,638,033 | Buchele et al. | May 12, 1953 |
| 2,685,238 | Baker | Aug. 3, 1954 |
| 2,841,063 | Park | July 1, 1958 |

FOREIGN PATENTS

| 15,188 | Great Britain | of 1908 |
| 225,398 | Great Britain | Dec. 4, 1924 |
| 299,065 | Germany | June 30, 1951 |
| 620,538 | Germany | Oct. 23, 1935 |
| 717,621 | Germany | Feb. 18, 1942 |
| 1,049,684 | France | Aug. 19, 1953 |